Sept. 1, 1931.   J. A. VOLK, JR   1,821,533

ELECTRICAL FIXTURE

Filed June 19, 1928

INVENTOR
Joseph A. Volk Jr.
BY
E. W. Scherr Jr. ATTORNEY

Patented Sept. 1, 1931

1,821,533

UNITED STATES PATENT OFFICE

JOSEPH A. VOLK, JR., OF SOUTH NORWALK, CONNECTICUT

ELECTRICAL FIXTURE

Application filed June 19, 1928. Serial No. 286,648.

My present invention relates to an electrical fixture adapted to be used as an outlet box or a junction box or the like; and by my invention I am able to provide the electrician with a single form of fixture which nevertheless will be usable in all the same ways as the several forms with which he has heretofore had to provide himself to meet the requirements of any given electrical installation he may be working on. In other words, the electrician with my new fixture takes along to the job outlet boxes all of the same kind instead of a lot of different kinds for making one, two, three and four way connections, etc.

Figure 1:
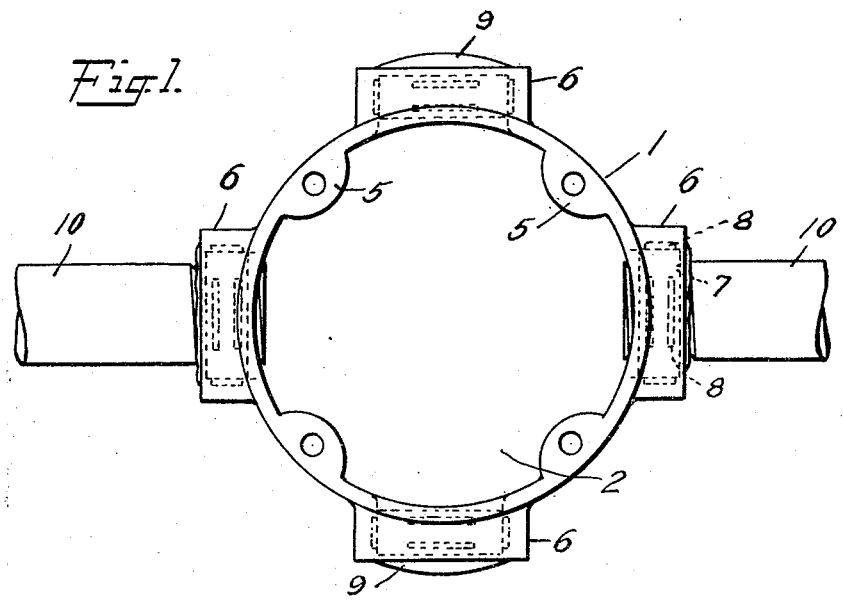
Figure 2:
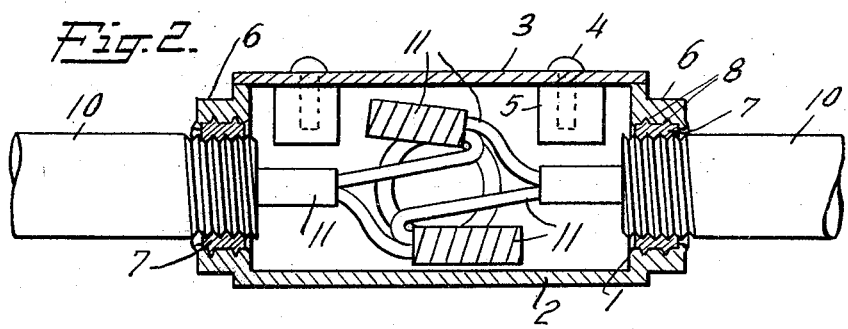
Figure 3:
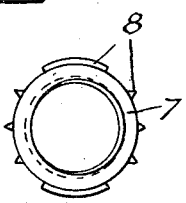
Figure 4:
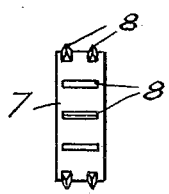
Figure 5:
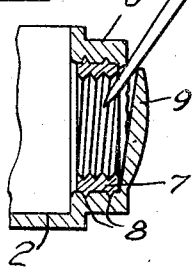
Figure 6:
Figure 7:
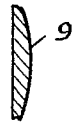

The drawings show my invention embodied in substantially the form preferred by me at present. In them, Fig. 1 is a top plan view of an outlet or junction box within my invention shown connecting two electrical conduit pipes and having its cover removed; Fig. 2 is a vertical cross-section, partly in elevation, through the devices shown in Fig. 1 to which latter has been added the wiring and a cover for the box; Figs. 3 and 4 are end and side elevations of one of the bushings hereinafter described forming part of the construction in Figs. 1 and 2; Fig. 5 shows a fragment of the box including one of its nipples and also shows a pointed tool in the act of breaking away the thin wall of the box enclosing the outer end of the bushing so as to expose said bushing to permit a conduit pipe to be coupled therewith as shown in Figs. 1 and 2; and Figs. 6 and 7 are respectively a face and a vertical cross-sectional view of the fragment of the box wall supposed to be removed by the operation shown in Fig. 5.

Describing my invention by means of the aforesaid preferred illustrative embodiment shown in the drawings:—I prefer to mold the box, which may take any shape or form with any number of nipples or connections, out of preferably non-corrosive metal such as an aluminum alloy. However, any other metallic or non-metallic material suitable for the purposes of the invention or adapted thereto may be employed. The particular fixture shown has a cylindrical side wall 1 with an integral flat bottom 2 and a flat circular removable cover 3. This cover is securable in place as usual by screws 4 passing through holes in the cover and engaging screw-threaded holes in bosses 5 on the inside of the cylindrical wall of the box.

The particular box shown has four nipples 6 radially integral with its sides; but, of course, it will be understood there may be any practical number of these; also, that one or more may be provided additionally in the bottom of the bosses.

Molded so as to be contained axially within each nipple is a preferably internally screw-threaded bushing 7. These bushings are also preferably made of metal. One of these bushings is shown in end and side elevation in Figs. 3 and 4 before it is molded in place in the walls of the box. 8 designates integral projections on the outer periphery of each bushing extending both circumferentially thereof as well as lengthwise. When the bushings have been molded in the walls of the box, the molded material of said walls and nipples keys into the spaces between said projections 8 so that said projections prevent the bushings in the finished box from becoming loose in the nipples in any direction. These bushings are preferably made separately and then molded in place as herein described because it is easier in that way to form the screw threads in the fixture for connection with the conduit pipes.

While the box is being molded or formed so that the bushings 7 are contained within its walls, arrangements are made so that the interiors of the bushings are kept free from the metal or other moldable material of which the box is made, and so that said interiors of the bushings are in communication with the interior of the box in the finished article. Also, it is arranged that said metal or other moldable material shall in the molding of the box cover over or enclose the outer ends of the bushings 7 in the walls of the box as shown in the drawings. The described closures for the outer ends of the bushings are thereby automatically formed during the molding of the box, said integral closures being designated by the numeral 9 in the drawings. The material of these closures is relatively thin and adapted to be readily broken through by any suitable tool (applied inside or outside) and removed, so as to fully expose the bore of any particular bushing or bushings to which the electrician desires to couple a conduit pipe or pipes 10. Figs. 1 and 2 show two of the bushings in use; and two of them out of use, the latter being meanwhile completely sealed by the aforesaid integral closures 9. Figs. 6 and 7 show one of the closures 9 supposed to have come away in one piece although, of course, it may come away in fragments.

Fig. 2 shows at 11 the usual electrical wires carried by the pipes 10 and the connections between said wires within the box.

Comparing the box of Fig. 1 with the ordinary four-way box, the latter can be used only on a four-way job unless the trouble be taken to plug up the unused nipples. The result is that the electrician provides himself with various kinds of boxes to get the different number and arrangement of nipples or outlets. On the other hand, in my invention one kind of box serves all purposes. The nipples are all sealed to start with and the electrician opens up only those which he needs for the particular job in hand.

The advantage and increased practicability of my fixture over the old type will be apparent.

Of course, further changes and modifications may be made in the aforesaid practical embodiment of my invention which will nevertheless still be within the spirit of the foregoing disclosure and within the meaning and spirit of the claims and which as such are intended to be covered by said claims.

What I claim is:

1. In an electrical fixture, the combination with a molded box of one or more internally screw-threaded bushings molded into the walls of said box with the interior of the bushings open to the interior of the box, the material of said walls thinly covering the outer ends of the bushings so as to be readily broken away preparatory to coupling conduits or the like therewith.

2. In an electrical fixture, the combination with a molded box of one or more bushings molded into the walls of said box with the interior of the bushings open to the interior of the box, the material of said walls covering the outer ends of the bushings but being adapted to be readily broken away preparatory to coupling conduits or the like therewith.

Signed at New York city, in the county of New York and State of New York this 13th day of June A. D., 1928.

JOSEPH A. VOLK, JR.